US011224203B2

(12) United States Patent
Spivak et al.

(10) Patent No.: US 11,224,203 B2
(45) Date of Patent: Jan. 18, 2022

(54) EDIBLE PET DENTAL TREAT

(71) Applicant: Loving Pets Corporation, Cranbury Township, NJ (US)

(72) Inventors: David Spivak, Monmouth Junction, NJ (US); Eric Abbey, East Brunswick, NJ (US)

(73) Assignee: LOVING PETS CORPORATION, Cranbury Township, NJ (US)

( * ) Notice: Subject to any disclaimer, the term of this patent is extended or adjusted under 35 U.S.C. 154(b) by 787 days.

(21) Appl. No.: 15/465,351

(22) Filed: Mar. 21, 2017

(65) Prior Publication Data

US 2018/0271061 A1    Sep. 27, 2018

(51) Int. Cl.
*A01K 15/02*    (2006.01)

(52) U.S. Cl.
CPC ................... *A01K 15/026* (2013.01)

(58) Field of Classification Search
CPC .............................. A01K 15/02; A01K 15/026
USPC ........................................................ 426/104
See application file for complete search history.

(56) References Cited

U.S. PATENT DOCUMENTS

| | | | | |
|---|---|---|---|---|
| 4,802,444 A | * | 2/1989 | Markham | A01K 13/00 119/709 |
| 5,647,302 A | * | 7/1997 | Shipp | A01K 15/026 119/709 |
| 6,739,287 B1 | * | 5/2004 | Sarantis | A01K 15/026 119/702 |
| 2006/0188632 A1 | * | 8/2006 | Nie | A23K 40/20 426/549 |
| 2015/0090193 A1 | * | 4/2015 | Giarrizzo | A01K 15/026 119/709 |
| 2017/0231195 A1 | * | 8/2017 | Dewey | A01K 15/026 119/707 |

\* cited by examiner

*Primary Examiner* — Jyoti Chawla
(74) *Attorney, Agent, or Firm* — Standley Law Group LLP

(57) ABSTRACT

An edible pet dental treat comprised of a substantially hard edible material formed into ribs having channel portions for cleaning pet teeth as it is being chewed. The edible treat is comprised of a plurality of ribs/channels formed on two sides of a bulb portion. The present invention also has first and second end portions with protrusions for massaging and scraping the tongue of the pet.

29 Claims, 3 Drawing Sheets

EDIBLE PET DENTAL TREAT

BACKGROUND OF THE INVENTIVE FIELD

The present invention is directed to the field of pet dental treats. More specifically, the present invention is related to a pet treat comprised of a substantially hard or hard edible material formed into ribs having channel portions for cleaning and removing tartar from pet teeth as it is being chewed. The edible treat is preferably comprised of a plurality of ribs/channels formed on two sides of a bulb portion. The present invention also has first and second end portions with protrusions for massaging and scraping the tongue of the pet for freshening breath.

The present invention is adapted to promote movement inside the mouth of the pet and is comprised of a unique combination of ribs, channels, cut-outs or openings, and protrusions for providing more ways to clean pet teeth, gums and tongues. The present invention also provides more surface area than traditional pet dental apparatus for promoting mouth cleanliness and health.

SUMMARY OF THE GENERAL INVENTIVE CONCEPT

In one embodiment of the invention, the invention is comprised of: a plurality of circumferential ribs placed in a first row; a plurality of channels formed between the plurality of circumferential ribs of the first row of circumferential ribs; wherein the channels are adapted to accept pet teeth; a bulb portion formed in a substantially orb shape, having a first and second end, wherein the first end of the bulb portion is attached to a first end of the first row of circumferential ribs; a plurality of circumferential ribs placed in a second row; a plurality of channels formed between the plurality of circumferential ribs of the second row of circumferential ribs; wherein a first end of the second row of circumferential ribs is attached to the second end of the bulb portion; and wherein the plurality of circumferential ribs of the first and second rows and the bulb portion are comprised of a substantially hard or hard edible material formulated for removing tartar or plaque from the teeth as the pet dental apparatus is being chewed.

In an alternative embodiment, the dental apparatus is further comprised of: a first end portion attached to a second end of the first row of circumferential ribs; a plurality of protrusions on the first end portion for scraping a pet tongue; a second end portion attached to a second end of the second row of circumferential ribs; and a plurality of protrusions on the second end portion for scraping a pet tongue.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the exemplary embodiments refers to the accompanying figures that form a part thereof. The detailed description provides explanations by way of exemplary embodiments. It is to be understood that other embodiments may be used having mechanical changes that incorporate the scope of the present invention without departing from the spirit of the invention.

Figure 1:
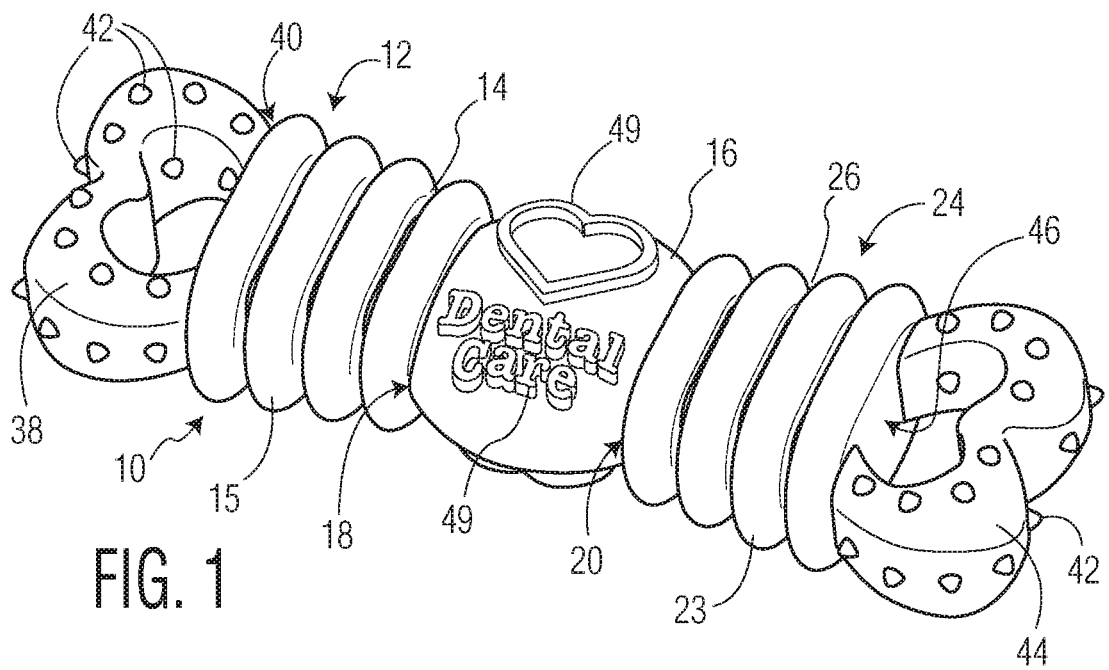
FIG. 1 a front perspective view of one embodiment of the pet dental apparatus of the present invention.
Figure 2:
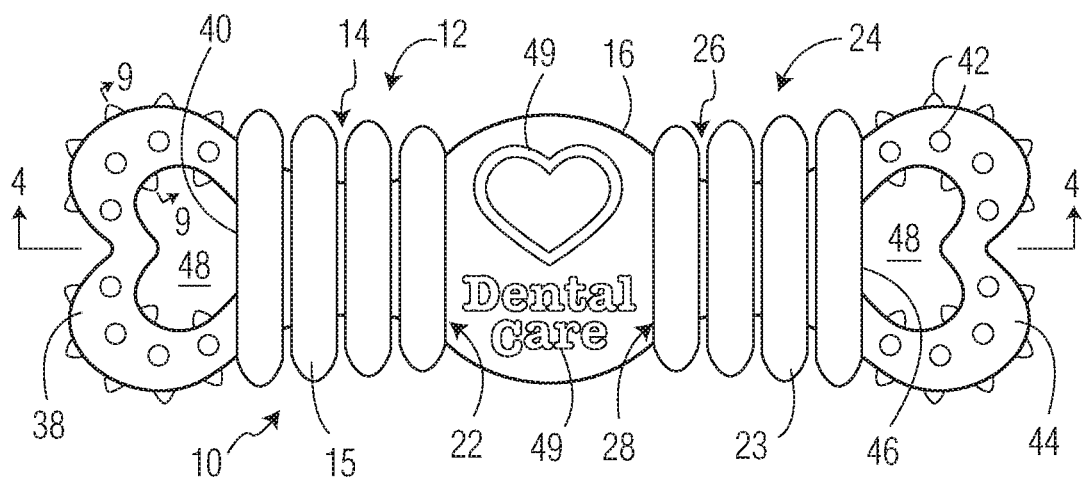
FIG. 2 is a front plan view of the pet dental apparatus of FIG. 1.
Figure 3:
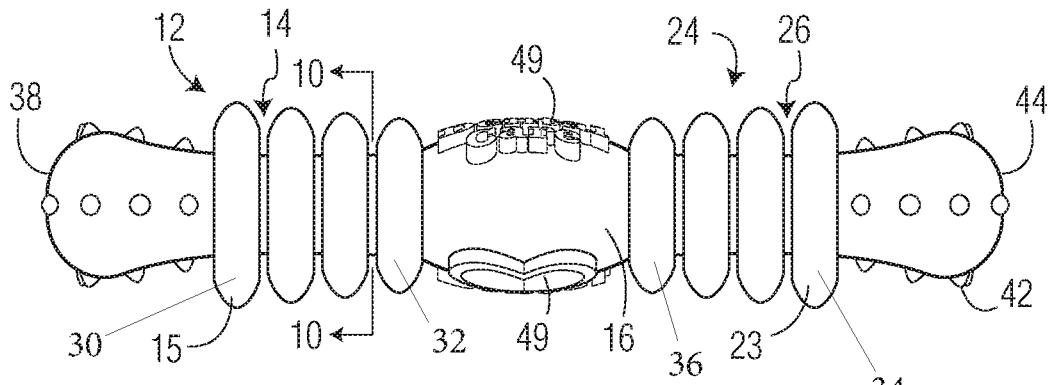
FIG. 3 is a side plan view of the pet dental apparatus of FIG. 1.

FIG. 1 is a front perspective view of one embodiment of the pet dental apparatus 10 of the present invention. FIG. 2 is a front plan view of the pet dental apparatus of FIG. 1. FIG. 3 is a side plan view of the pet dental apparatus of FIG. 1.

In the preferred embodiment, the pet dental apparatus is comprised of a plurality of circumferential ribs placed in a first row 12; a plurality of channels 14 formed between the plurality of circumferential ribs of the first row of ribs 15; a bulb portion 16 formed in a substantially orb or circle shape having a first and second end 18, 20, and wherein the first end of the bulb portion is attached to a first end 22 of the first row of circumferential ribs.

In the preferred embodiment, the pet dental apparatus is also comprised of a plurality of circumferential ribs 23 placed in a second row 24. There are a plurality of channels 26 formed between the plurality of circumferential ribs of the second row of ribs. As illustrated, a first end 28 of the second row of circumferential ribs is attached to the second end of the bulb portion.

In the present invention "circumference" and "circumferential" refers to a curved geometric figure such as a circle or oval. In the present invention, "ribs" refers to the curved raised portions of the dental device. In the preferred embodiment, the ribs are formed in a circumferential shape. The channels formed between the ribs are adapted to accept pet teeth. The first and second rows of circumferential ribs are adapted to promote movement of the pet dental apparatus in a mouth of a pet.

In the preferred embodiment, the treats of the present invention have ribbed raised portions that extend fully around the treat. Therefore, the present invention does a better job of providing breakaway areas of smaller pieces to avoid choking hazards of larger pieces. The circumferential ribs also provide much more surface area to promote better teeth cleaning. In one embodiment, the first and second rows of circumferential ribs are each comprised of four circumferential ribs placed in a row aligned by a center axis A-A.

Figure 4:
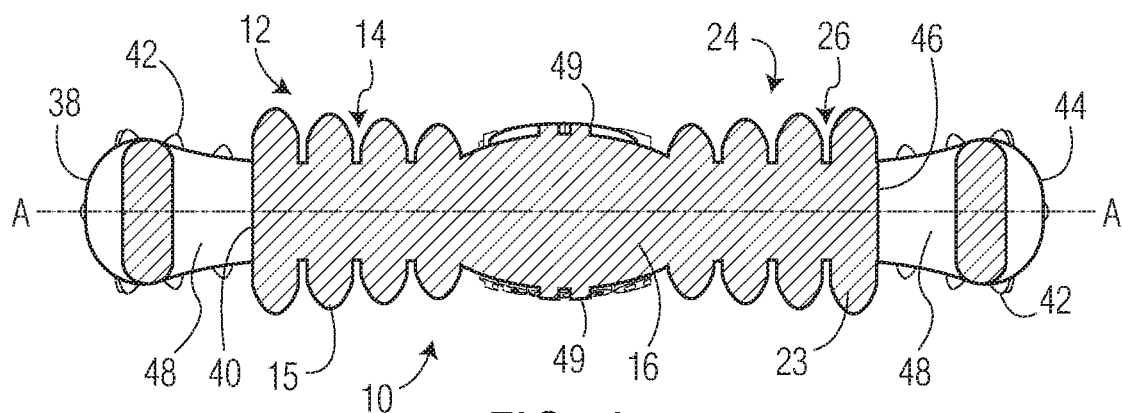
FIG. 4 is a cross-sectional view taken along lines 4-4.
Figure 5:
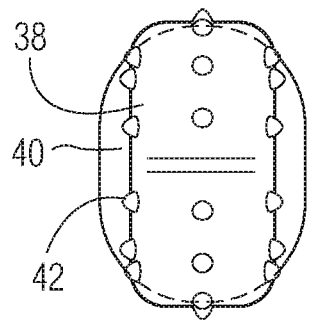
FIG. 5 is an end plan view of the pet dental apparatus of FIG. 1.
Figure 6:
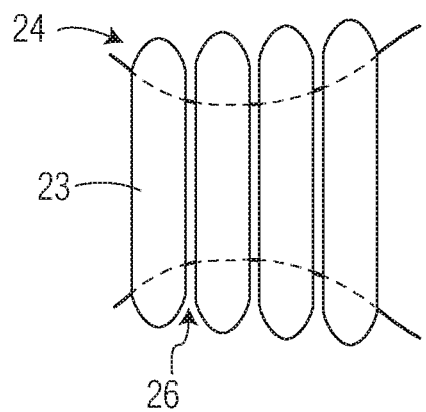
FIG. 6. is a close-up view of the circumferential ribs of the present invention.

FIG. 4 is a cross-sectional view taken along lines 4-4 in FIG. 2. FIG. 5 is an end plan view of the pet dental apparatus of FIG. 1. FIG. 6. is a close-up view of the circumferential ribs of the present invention. In one embodiment, the first row of circumferential ribs are configured in a tapered configuration wherein the outermost circumferential rib 30 of the first row of circumferential ribs has a larger diameter than the innermost circumferential rib 32 of the first row of circumferential ribs. Similarly, the second row of circumferential ribs are configured in a tapered configuration wherein the outermost circumferential rib 34 of the second row of circumferential ribs has a larger diameter than the innermost circumferential rib 36 of the second row of circumferential ribs.

Figure 7:
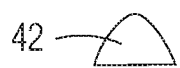
FIG. 7 is a close-up view of the protrusions of the present invention.

In one embodiment, the pet dental apparatus of the present invention is further comprised of a first end portion 38 attached to a second end 40 of the first row of circumferential ribs. The first end portion is preferably comprised of a plurality of protrusions 42 for scraping a pet tongue while it is being chewed (for the purpose of freshening breath). This embodiment is also comprised of a second end portion 44 attached to a second end 46 of the second row of circumferential ribs having a plurality of protrusions for scraping a pet tongue. FIG. 7 is a close-up view of the protrusions of the present invention. In another embodiment, the first and second ends each have a cut-out or opening portion 48 for accepting a pet tongue for cleaning both sides of the pet tongue.

In the preferred embodiment, the entire pet dental treat is comprised of a substantially hard or hard edible material for removing tartar or plaque from the teeth as the pet dental apparatus is being chewed. In one embodiment, the pet dental apparatus is comprised of mint, parsley and chlorophyll for breath freshening. As one example, the pet dental apparatus is comprised of the following ingredients: rice flour, vegetable glycerin, wheat starch, water for processing, chicken, gelatin, Lecithin, Xanthan Gum, Natural Smoke Flavor, Mint Extract, Parsley, Calcium Carbonate, Cellulose Powder, Chlorophyll Green, preserved with Citric Acid, Potassium Sorbate mixed tocopherols. In one embodiment, the dental treat of the present invention is comprised of 14% crude protein, 3% crude fat, 2% crude fiber, 22% moisture.

Figure 8:
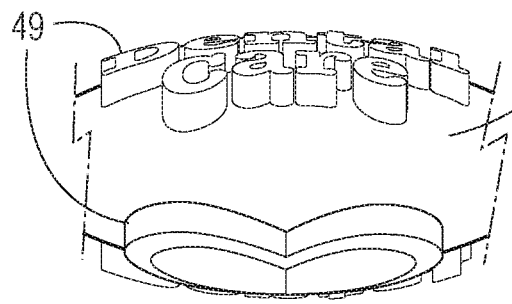
FIG. 8 is a close-up side view of the bulb portion of the present invention.
Figure 9:
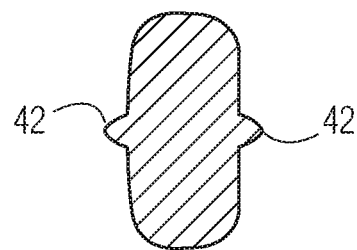
FIG. 9 is a cross-sectional view of the pet dental apparatus taken along lines 9-9.
Figure 10:
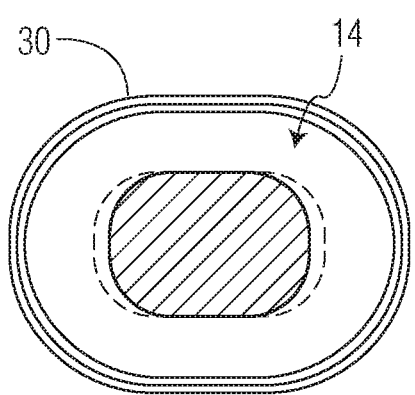
FIG. 10 is a cross-sectional view of the pet dental apparatus taken along lines 10-10.
Figure 11:
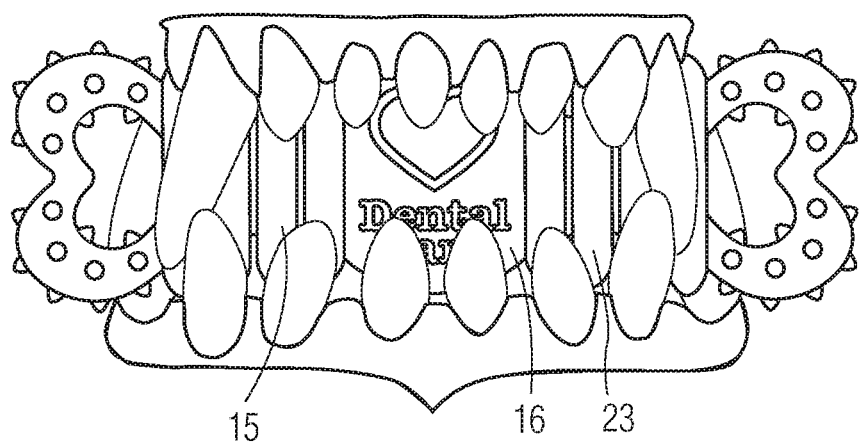
FIG. 11 is an illustration of the pet dental apparatus in the mouth of a pet.

FIG. 8 is a close-up side view of the bulb portion of the present invention. FIG. 9 is a cross-sectional view of the pet dental apparatus taken along lines 9-9 in FIG. 2. FIG. 10 is a cross-sectional view of the pet dental apparatus taken along lines 10-10 in FIG. 3. FIG. 11 is an illustration of the pet dental apparatus in the mouth of a pet. In the preferred embodiment, the bulb portion is adapted to fit inside a pet's mouth for cleaning the back of the pet's teeth and tongue. Raised decorative elements 49 also help form scraping surfaces for the back of the teeth. The length of the pet dental apparatus is configured so that the first and second end portions are adapted to protrude from the sides of the pet's mouth when the bulb portion resides under the roof of the pet's mouth.

The pet can move the treat around in their mouth when chewing on one end, which also provides cleaning via the protrusion 42. The different size ribs enable the device to fit in different mouth sizes so one treat size can be fed to dogs of various sizes, thus reducing the need for more than 3 sizes of treats.

While certain embodiments of the present invention are described in detail above, the scope of the invention is not to be considered limited by such disclosure, and modifications are possible without departing from the spirit of the invention as evidenced by the following claims:

What is claimed is:

1. A pet dental apparatus, comprising:
a plurality of circumferential ribs placed in a first row;
a plurality of channels formed between the plurality of circumferential ribs of the first row of circumferential ribs;
wherein the channels are adapted to accept pet teeth;
wherein the plurality of circumferential ribs of the first row of circumferential ribs are comprised of a substantially hard or hard edible material for removing tartar or plaque from the teeth as the pet dental apparatus is being chewed;
a bulb portion formed in a substantially orb shape, having a first and second end, wherein the first end of the bulb portion is connected to a first end of the first row of circumferential ribs, wherein the bulb portion is comprised of a substantially hard or hard edible material for removing tartar or plaque from the teeth as the pet dental apparatus is being chewed;
a plurality of circumferential ribs placed in a second row;
a plurality of channels formed between the plurality of circumferential ribs of the second row of circumferential ribs;
wherein the plurality of circumferential ribs of the second row of circumferential ribs are comprised of a substantially hard or hard edible material for removing tartar or plaque from the teeth as the treat is being chewed;
wherein a first end of the second row of circumferential ribs is connected to the second end of the bulb portion;
wherein the bulb portion resides in between the first and second rows of circumferential ribs;
wherein each of the plurality of circumferential ribs are raised portions protruding from the pet dental apparatus, and wherein the plurality of circumferential ribs placed in a first row are in a symmetrical configuration to the plurality of circumferential ribs placed in a second row on the other side of the bulb portion to promote movement of the dental apparatus in a mouth of a pet;
wherein each of the circumferential ribs are positioned to clean the pet's teeth when the bulb portion is in the pet's mouth and when the circumferential ribs move around the inside of the pet's mouth;
wherein at least one of the circumferential ribs of each of the first and second rows of circumferential ribs protrudes as far from the center axis of the pet dental apparatus as the bulb portion; and
wherein the substantially hard or hard edible material is adapted to fed to pets as a pet treat and is comprised of protein and fiber.

2. The pet dental apparatus of claim 1, further comprising:
a first end portion attached to a second end of the first row of circumferential ribs;
a plurality of protrusions on the first end portion for scraping a pet tongue.

3. The pet dental apparatus of claim 2, further comprising:
a second end portion attached to a second end of the second row of circumferential ribs;
a plurality of protrusions on the second end portion for scraping a pet tongue; and
wherein each of the end portions are formed of a substantially hard edible material with openings for accepting the pet's tongue to clean the tongue as the end portion scrapes against both sides of the pet's tongue.

4. The pet dental apparatus of claim 3, wherein the first and second ends each have an opening portion for accepting a pet tongue for cleaning both sides of the pet tongue.

5. The pet dental apparatus of claim 3, wherein the length of the pet dental apparatus is configured so that the first and second end portions are adapted to protrude from the sides of the pet's mouth when the bulb portion resides under the roof of the pet's mouth.

6. The pet dental apparatus of claim 1, wherein the pet dental apparatus is comprised of mint, parsley and chlorophyll for breath freshening.

7. The pet dental apparatus of claim 1, wherein the bulb portion is adapted to fit inside a pet's mouth for cleaning the back of the pet's teeth and tongue.

8. The pet dental apparatus of claim 1, wherein the first row of circumferential ribs are configured in a tapered configuration wherein the outermost circumferential rib of the first row of circumferential ribs protrudes farther from the center axis of the pet dental apparatus than the innermost circumferential rib of the first row of circumferential ribs;
wherein the second row of circumferential ribs are configured in a tapered configuration wherein the outermost circumferential rib of the second row of circumferential ribs protrudes farther from the center axis of the pet dental apparatus than the innermost circumferential rib of the second row of circumferential ribs; and
wherein the first and second rows of circumferential ribs are each in a tapered configuration starting from the outermost circumferential rib down to the innermost circumferential rib.

9. The pet dental apparatus of claim 1, wherein the plurality of circumferential ribs placed in a first row is comprised of four circumferential rings aligned by a center axis.

10. The pet dental apparatus of claim 1, wherein the ribs are in an oval shape.

11. The pet dental apparatus of claim 1, wherein the ribs are in a circular shape.

12. The pet dental apparatus of claim 1, wherein the circumferential ribs each have a circumference portion that is raised and wherein the space between any two of the circumferential ribs forms a channel.

13. The pet dental apparatus of claim 1, wherein each of the circumferential ribs form concentric rings equally spaced apart from each other where channels are formed between each of the circumferential ribs for fitting pet's teeth.

14. The pet dental apparatus of claim 1, wherein the channels extend away from the center axis of the dental apparatus in a stepwise fashion from an innermost channel to an outermost channel of the dental apparatus so that the outermost channel extends further away from the center axis then each of the inner channels.

15. The pet dental apparatus of claim 1, wherein the outermost circumferential ribs on each side of the bulb portion are adapted to scrape against the pet's canine teeth when the dental apparatus is engaged in the pet's mouth.

16. A pet dental apparatus, comprising:
a plurality of circumferential ribs placed in a first row;
a plurality of channels formed between the plurality of circumferential ribs of the first row of circumferential ribs;
wherein the channels are adapted to accept pet teeth;
a bulb portion formed in a substantially orb shape, having a first and second end, wherein the first end of the bulb portion is connected to a first end of the first row of circumferential ribs;
wherein the plurality of circumferential ribs of the first row and the bulb portion are comprised of a substantially hard or hard edible material for removing tartar or plaque from the teeth as the pet dental apparatus is being chewed;
a plurality of circumferential ribs placed in a second row;
a plurality of channels formed between the plurality of circumferential ribs of the second row of circumferential ribs;
wherein the plurality of circumferential ribs and plurality of channels of the second row of circumferential ribs are comprised of a substantially hard or hard edible material for removing tartar or plaque from the teeth as the treat is being chewed;
wherein a first end of the second row of circumferential ribs is connected to the second end of the bulb portion;
wherein the bulb portion resides in between the first and second rows of circumferential ribs;
wherein each of the plurality of circumferential ribs are raised portions protruding from the pet dental apparatus, and wherein the plurality of circumferential ribs placed in a first row are in a symmetrical configuration to the plurality of circumferential ribs placed in a second row on the other side of the bulb portion to promote movement of the dental apparatus in a mouth of a pet;
wherein each of the circumferential ribs are positioned to clean the pet's teeth when the bulb portion is in the pet's mouth and when the circumferential ribs move around the inside of the pet's mouth;
wherein at least one of the circumferential ribs of each of the first and second rows of circumferential ribs protrudes as far from the center axis of the pet dental apparatus as the bulb portion; and
wherein the substantially hard or hard edible material is adapted to fed to pets as a pet treat and is comprised of protein and fiber.

17. The pet dental apparatus of claim 16, further comprising:
a first end portion attached to a second end of the first row of circumferential ribs;
a plurality of protrusions on the first end portion for scraping a pet tongue.

18. The pet dental apparatus of claim 17, further comprising:
a second end portion attached to a second end of the second row of circumferential ribs;
a plurality of protrusions on the second end portion for scraping a pet tongue; and
wherein each of the end portions are formed of a substantially hard edible material with openings for accepting the pet's tongue to clean the tongue as the end portion scrapes against both sides of the pet's tongue.

19. The pet dental apparatus of claim 18, wherein the first and second ends each have an opening portion for accepting a pet tongue for cleaning both sides of the pet tongue.

20. The pet dental apparatus of claim 16, wherein the first row of circumferential ribs are configured in a tapered configuration wherein the outermost circumferential rib of the first row of circumferential ribs protrudes farther from the center axis of the pet dental apparatus than the innermost circumferential rib of the first row of circumferential ribs;
wherein the second row of circumferential ribs are configured in a tapered configuration wherein the outermost circumferential rib of the second row of circumferential ribs protrudes farther from the center axis of the pet dental apparatus than the innermost circumferential rib of the second row of circumferential ribs;

wherein the first and second rows of circumferential ribs are each in a tapered configuration starting from the outermost circumferential rib down to the innermost circumferential rib;

wherein each of the circumferential ribs form concentric rings equally spaced apart from each other where channels are formed between each of the circumferential ribs for fitting pet's teeth.

21. The pet dental apparatus of claim 16, wherein each of the circumferential ribs form concentric rings equally spaced apart from each other where channels are formed between each of the circumferential ribs for fitting pet's teeth.

22. The pet dental apparatus of claim 16, wherein the channels extend away from the center axis of the dental apparatus in a stepwise fashion from an innermost channel to an outermost channel of the dental apparatus so that the outermost channel extends further away from the center axis then each of the inner channels.

23. The pet dental apparatus of claim 16, wherein the outermost circumferential ribs on each side of the bulb portion are adapted to scrape against the pet's canine teeth when the dental apparatus is engaged in the pet's mouth.

24. A pet dental apparatus, comprising:
a plurality of circumferential ribs placed in a first row;
a plurality of channels formed between the plurality of circumferential ribs of the first row of circumferential ribs;
wherein the channels are adapted to accept pet teeth;
a bulb portion formed in a substantially orb shape, having a first and second end, wherein the first end of the bulb portion is connected to a first end of the first row of circumferential ribs;
a plurality of circumferential ribs placed in a second row;
a plurality of channels formed between the plurality of circumferential ribs of the second row of circumferential ribs;
wherein a first end of the second row of circumferential ribs is connected to the second end of the bulb portion;
wherein the bulb portion resides in between the first and second rows of circumferential ribs;
wherein each of the plurality of circumferential ribs are raised portions protruding from the pet dental apparatus, and wherein the plurality of circumferential ribs placed in a first row are in a symmetrical configuration to the plurality of circumferential ribs placed in a second row on the other side of the bulb portion to promote movement of the dental apparatus in a mouth of a pet;
wherein the first row of circumferential ribs are configured in a tapered configuration wherein the outermost circumferential rib of the first row of circumferential ribs protrudes farther from the center axis of the pet dental apparatus than the innermost circumferential rib of the first row of circumferential ribs;
wherein the second row of circumferential ribs are configured in a tapered configuration wherein the outermost circumferential rib of the second row of circumferential ribs protrudes farther from the center axis of the pet dental apparatus than the innermost circumferential rib of the second row of circumferential ribs;
wherein the first and second rows of circumferential ribs are each in a tapered configuration starting from the outermost circumferential rib down to the innermost circumferential rib;
wherein the plurality of circumferential ribs of the first and second rows and the bulb portion are comprised of a substantially hard or hard edible material for removing tartar or plaque from the teeth as the pet dental apparatus is being chewed;
wherein each of the circumferential ribs are positioned to clean the pet's teeth when the bulb portion is in the pet's mouth and when the circumferential ribs move around the inside of the pet's mouth;
wherein at least one of the circumferential ribs of each of the first and second rows of circumferential ribs protrudes as far from the center axis of the pet dental apparatus as the bulb portion; and
wherein the substantially hard or hard edible material is adapted to fed to pets as a pet treat and is comprised of protein and fiber.

25. The pet dental apparatus of claim 24, further comprising:
a first end portion attached to a second end of the first row of circumferential ribs;
a plurality of protrusions on the first end portion for scraping a pet tongue.

26. The pet dental apparatus of claim 25, further comprising:
a second end portion attached to a second end of the second row of circumferential ribs;
a plurality of protrusions on the second end portion for scraping a pet tongue.

27. The pet dental apparatus of claim 26, wherein each of the end portions are formed of a substantially hard edible material with openings for accepting the pet's tongue to clean the tongue as the end portion scrapes against both sides of the pet's tongue.

28. The pet dental apparatus of claim 24, wherein the channels extend away from the center axis of the dental apparatus in a stepwise fashion from an innermost channel to an outermost channel of the dental apparatus so that the outermost channel extends further away from the center axis then each of the inner channels.

29. The pet dental apparatus of claim 24, wherein the outermost circumferential ribs on each side of the bulb portion are adapted to scrape against the pet's canine teeth when the dental apparatus is engaged in the pet's mouth.

* * * * *